United States Patent [19]
Grewe et al.

[11] Patent Number: 5,657,258
[45] Date of Patent: Aug. 12, 1997

[54] MOBILE PEN COMPUTER HAVING AN INTEGRATED PALM REST

[75] Inventors: Anthony James Grewe, Holmdel, N.J.; Donald Marion Keen, Indianapolis, Ind.; Harish Shankar Mangrulkar, Colonia, N.J.; David Carroll Stowers, Nutley, N.J.; Michael Philip Zambelli, Livingston, N.J.

[73] Assignee: Lucent Technologies Inc., Murray Hill, N.J.

[21] Appl. No.: 605,579

[22] Filed: Feb. 22, 1996

Related U.S. Application Data

[63] Continuation of Ser. No. 316,585, Sep. 30, 1994, abandoned.
[51] Int. Cl.$^6$ .................................................. G06F 1/16
[52] U.S. Cl. .................... 364/708.1; 361/681; 345/173
[58] Field of Search ...................... 364/708.1; 361/679, 361/680, 681, 683; 341/22; 345/173

[56] References Cited

U.S. PATENT DOCUMENTS

| | | | |
|---|---|---|---|
| 5,126,725 | 6/1992 | Yanagisawa | 364/708.1 |
| 5,139,439 | 8/1992 | Shie | 364/708.1 X |
| 5,227,615 | 7/1993 | Oogita | 364/708.1 X |
| 5,268,817 | 12/1993 | Miyagawa et al. | 364/708.1 |
| 5,372,441 | 12/1994 | Louis | 341/22 |
| 5,428,355 | 6/1995 | Jondrow et al. | 364/708.1 X |

FOREIGN PATENT DOCUMENTS

| | | | |
|---|---|---|---|
| 91/05327 | 4/1991 | WIPO | 345/173 |

*Primary Examiner*—Tan V. Mai

[57] ABSTRACT

A pen computer has a double hinge connector and a first member which is rotatably connected to the connector. The first member has a pen sensitive screen. A second member, having a flat surface, is also rotatably connected to the connector. The pen computer is in a closed position when an angle between the first and second members is equal to zero degrees. The pen computer is in an open position when the angle between the first and second members is substantially equal to 180 degrees. When the pen computer is in the open position, the flat surface of the second member is substantially level with the pen sensitive screen of the first member, such that the flat surface is operable as a palm rest for facilitating the use of the pen sensitive screen.

6 Claims, 8 Drawing Sheets

MOBILE PEN COMPUTER HAVING AN INTEGRATED PALM REST

This is a continuation of application Ser. No. 08/316, 5185 filed Sep. 30, 1994, now abandoned.

BACKGROUND OF THE INVENTION

1. Field of the Invention

The present invention relates generally to computers, and more particularly to pen computers, also known as personal digital assistants or personal communicators.

2. Related Art

There is a need today for mobile computing capability. This has resulted in the production of physically smaller and lighter personal computers, such as laptop computers, notebook computers, and tablet computers (listed in order of decreasing size and weight).

Smaller computers (such as tablet computers) generally have the same processing power and capabilities as their larger counterparts. There are, however, some disadvantages associated with smaller computers. For example, smaller computers are typically too small to accommodate an adequate, "user friendly" keyboard.

Accordingly, such smaller computers often include different mechanisms for receiving user input, such as pen sensitive displays. Smaller computers (i.e., tablet computers) which employ pen sensitive displays are called "pen computers". A pen computer is capable of recognizing user data and commands written on the pen computer's pen sensitive display. Examples of pen computers include the Newton message pad computer produced by Apple Computer, the Casio Z-7000, and the Tandy Zoomer.

Pen computers generally fall into two categories. The pen computers in the first category, such as the Newton computer, have pen sensitive displays which occupy the entire working surface. The primary advantage of these pen computers is their small size (they are a little larger than a typical paperback book) and their mobility (which results from their small size). However, it is difficult to use the pen sensitive display with these pen computers, particularly when standing or when a level and stable resting surface is unavailable. This is true, because these pen computers do not provide the user with a flat surface on which to rest her hand while writing (the user could rest her hand on the pen sensitive display, but this would result in false readings). Consequently, the user is forced to "float" her hand above the pen sensitive display, resulting in fatigue and illegible writing.

The pen computers in the second category, such as the NCR Model 3125, the Gridpad Model 2050, and the EO Models 440 and 880, are relatively large in size (approximately the size of a clip board). In these pen computers, the pen sensitive display occupies only a portion of the working surface. Accordingly, these pen computers provide the user with some surface area upon which she can rest her hand while writing. However, this surface area is not optimal, as it typically is not level with the pen sensitive display, and/or includes some protrusions (such as power and control switches, cables, ports, hinges, locking mechanisms, etc.) which impede user writing. Also, because of their larger size, these pen computers are not as mobile as the pen computers of the first category.

SUMMARY OF THE INVENTION

The present invention is directed to a pen computer having a double hinge connector and a first member which is rotatably connected to the connector. The first member has a pen sensitive screen. A second member, having a flat surface, is also rotatably connected to the connector.

The pen computer is in a closed position when an angle between the first and second members is equal to zero degrees. The pen computer is in an open position when the angle between the first and second members is substantially equal to 180 degrees.

When the pen computer is in the open position, the flat surface of the second member is substantially level with the pen sensitive screen of the first member, such that the flat surface is operable as a palm rest for facilitating the use of the pen sensitive screen.

Further features and advantages of the present invention, as well as the structure and operation of various embodiments of the present invention, are described in detail below with reference to the accompanying drawings. In the drawings, like reference numbers indicate identical or functionally similar elements.

BRIEF DESCRIPTION OF THE FIGURES

The present invention will be described with reference to the accompanying drawings, wherein.

DETAILED DESCRIPTION OF THE PREFERRED EMBODIMENTS

Figure 1:
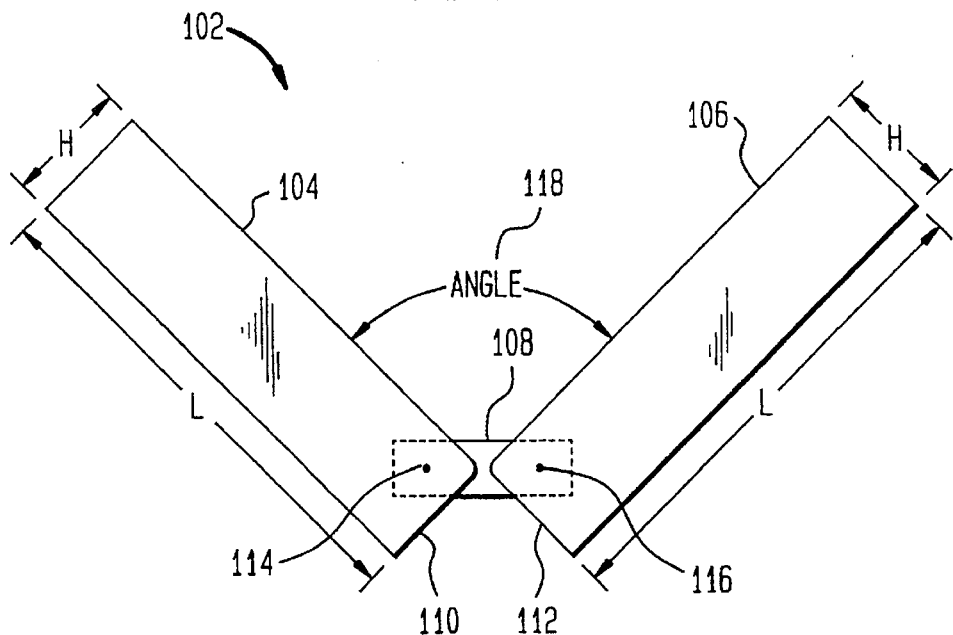
FIGS. 1 and 3 are side views of a pen computer according to a preferred embodiment of the present invention.

The present invention is a small, mobile pen computer (also called a personal digital assistant or a personal communicator) having a pen sensitive display and a palm rest for facilitating the use of the pen sensitive display. FIG. 1 is a side view of a pen computer 102 according to a preferred embodiment of the present invention. For readability purposes, details of the pen computer 102 are not shown in FIG. 1.

The pen computer 102 includes a first member 104 and a second member 106. The first member 104 is rotatably connected to a connector 108 such that the first member 104 is rotatable about a first axis 114. Similarly, the second member 106 is rotatably connected to the connector 108 such that the second member 106 is rotatable about a second axis 116.

The degree of rotation of the first member 104 and the second member 106 is represented herein by an angle 118, which is the angle between the first and second members 104, 106. The angle 118 ranges from 0 degrees to 180 degrees. When the angle; 118 is equal to 0 degrees, the pen computer 102 is said to be in a closed position. When the angle 118 is equal to 180 degrees, the pen computer 102 is said to be in an open position. When the pen computer 102 is in the open computer, a surface 110 of the first member 104 contacts a surface 112 of the second member 106. Such contact prevents the angle 118 from exceeding 180 degrees.

According to the present invention, the pen computer 102 resembles a book, where the first and second members 104, 106 correspond to leaves of the book, and the connector 108 corresponds to the spine of the book. When the pen computer 102 is in the closed position, then the book is closed. When the pen computer 102 is in the open position, then the book is open.

The use of a book format is advantageous, since it is easier to hold and write on from all orientations. Also, it is easier to acoustically isolate a microphone and/or speaker when using a book format, thereby improving audio intelligibility. Further, a book design provides improved weight balance.

Figure 2:
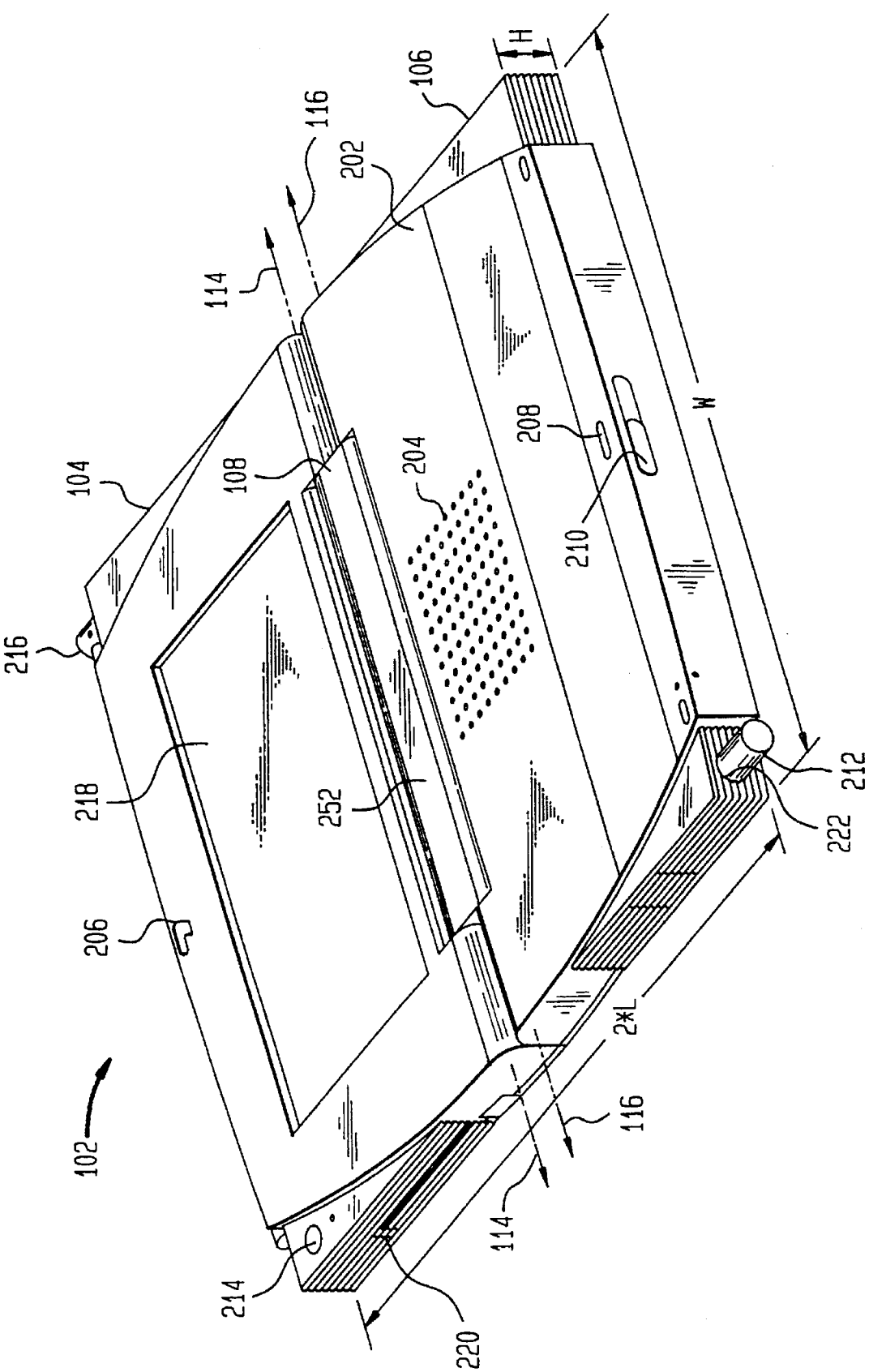
FIGS. 2 and 4 are perspective views of the pen computer of the present invention.

FIG. 2 is a perspective view of the pen computer 102. The pen computer 102 is in the open position. The first member 104 includes a pen sensitive display 218, which represents any well known pen sensitive display. The first member 104 also includes a power switch 214 and a disk drive 220. An antenna 216 is rotatably connected to the first member 104. As discussed above, the first member 104 is rotatably connected to the connector 108 such that the first member 104 is rotatable about the first axis 114.

The second member 106 includes an audio speaker 204 and a cavity 222 (best shown in FIG. 4) for receiving and storing a pen 212. As discussed above, the second member 106 is rotatably connected to the connector 108 such that the second member 106 is rotatable about the second axis 116.

A first latching mechanism is provided for locking the pen computer 102 in the closed position. The first latching mechanism preferably includes a hook 206 affixed to the first member 104 and a corresponding locking slot 208 in the second member 106. When the pen computer 102 is closed, the hook 206 enters the slot 208, and is secured therein in a well known manner. The first latching mechanism is unlocked in a well known manner by sliding a switch 210 to thereby cause the locking slot 208 to release the hook 206. It should be understood that the particular latching mechanism shown in FIG. 2 and described above is provided for illustrative purposes only. Any other well known latching means may alternatively be used.

A second latching mechanism (not shown) is also provided for locking the pen computer 102 in the open position. Any well known latching means may be used to implement the second latching mechanism, such as that shown in FIG. 2 and described above for the first latching mechanism.

Figure 8:
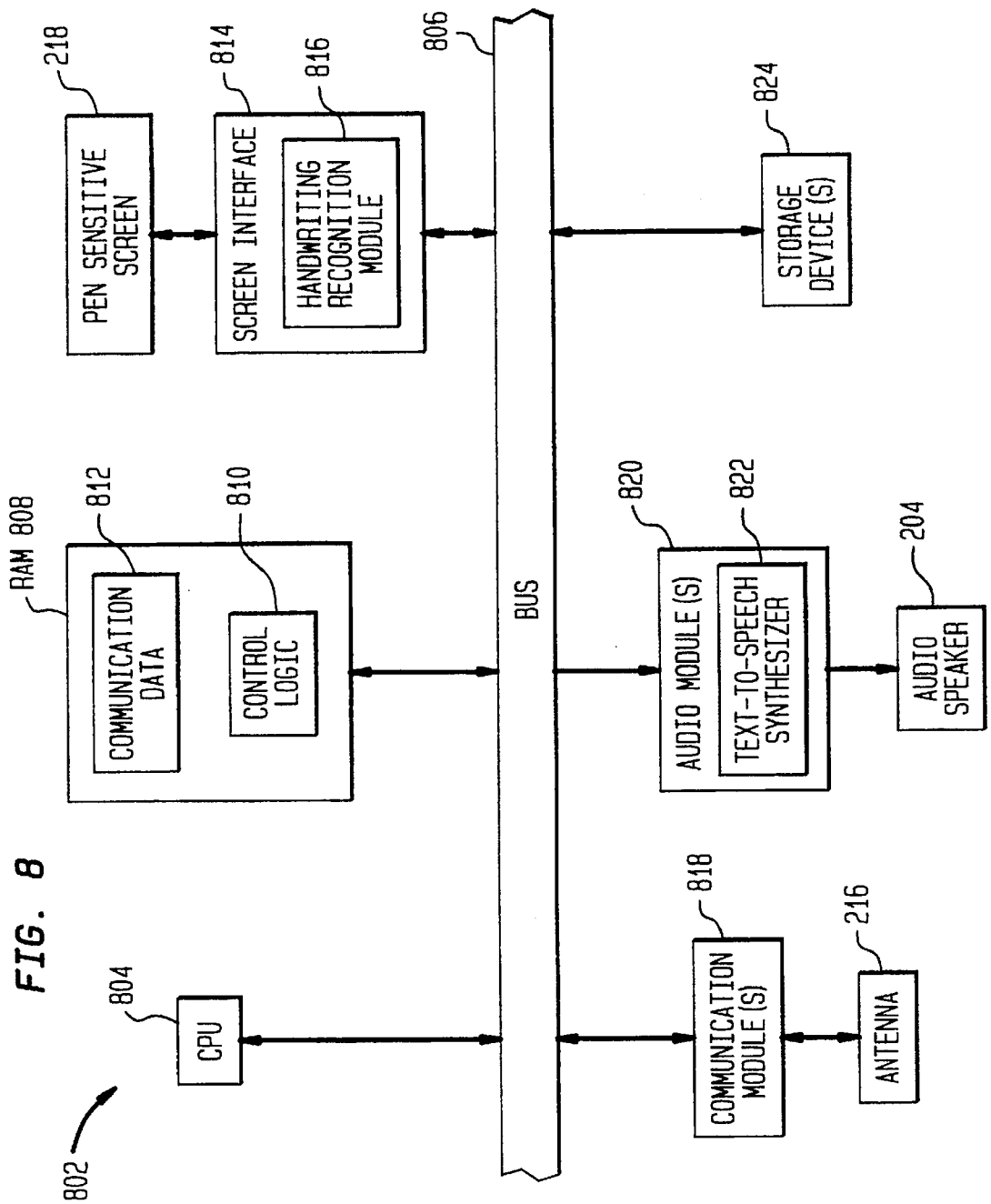
FIG. 8 is a block diagram of the electrical and communication components of the pen computer of the present invention.

FIG. 8 is a block diagram 802 of the electrical and communication components of the pen computer 102 according to an embodiment of the present invention. The pen computer 102 includes a central processing unit (CPU) 804 that is connected to other components via a data bus 806. The CPU 804 operates in accordance with control logic 810, preferably stored in a random access memory (RAM) 808, to control the operation of the components of the pen computer 102. Preferably, the control logic 810 is implemented, as a software program, such that the CPU 804 operates according to instructions contained in the software program. Alternatively, the CPU 804 and the control logic 810 are implemented as a hardware state machine.

A pen sensitive screen 218 is connected to the bus 806 via a screen interface 814. The pen sensitive screen 218 is preferably located in the first member 104, as stated above. Preferably, the pen sensitive screen 218 is configured and oriented in a landscape mode. The screen interface 814 operates to recognize and interpret user writing (preferably made with the pen 212) applied to the pen sensitive screen 218. The screen interface 814 includes a handwriting recognition module 816 for recognizing such user writing, and for transferring appropriate digital representations of such user writing to the CPU 804 via the bus 806. Systems and methods of recognizing handwriting are well known. The handwriting recognition module 816 may be implemented using any of such well known systems and methods.

The pen computer 102 includes one or more communication modules 818 connected to an antenna 216 (which is preferably rotatably connected to the first member 104, as stated above). Such communication modules 818 include, for example, a modem, a send and/or receive facsimile module, a cellular telephone handset and appropriate related circuitry, a port for connection to the telephone network, etc. These communication devices are all well known.

The pen computer 102 also includes one or more audio modules 820, such as a well known text-to-speech synthesizer 822, and an audio speaker 204 (which is preferably located in the second member 106, as stated above). The pen computer 102 further includes one or more storage devices, such as a hard disk drive (not shown) and/or a floppy disk drive 220, that is preferably located in the first member 104 (as stated above).

The functionality of the pen computer 102 is similar to the functionality of any well known, modern personal computer. For example, the pen computer 102 preferably has well known "mobile office" capabilities, such as database functionality, word processing functionality, calendar and scheduling functionality, telephone directory and dialing functionality (telephone directory information is preferably stored in the RAM 808 as communication data 812), journal functionality, time management functionality, calculator functionality, money management functionality, etc. Such functionality is achieved in a well known manner by executing appropriate computer software (represented as control logic 810) in the pen computer 102.

The pen computer 102 also includes various communication capabilities (including wireless communication capabilities), such as sending and receiving data and facsimile transmissions. Such wireless communication capabilities are achieved in a well know manner by using the communication modules 818 and the antenna 216.

According to the present invention, the pen computer 102 receives user input in a well known manner via the pen sensitive screen 218. The pen computer 102 outputs messages, instructions, data, etc., to the user via the pen sensitive screen 218 and also the audio modules 820 and the audio speaker 204. Data, programs, etc., are stored and retrieved from the storage devices 824.

Figure 3:
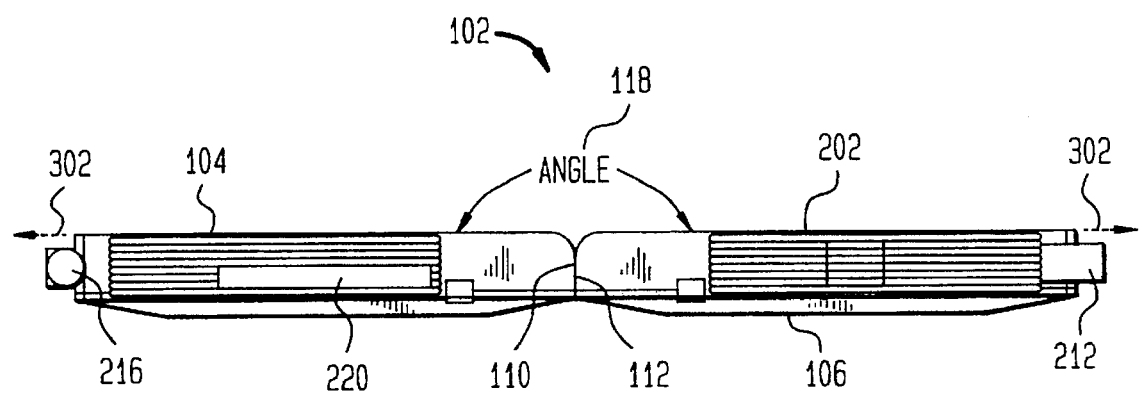

Referring again to FIG. 2, the second member 106 provides a palm rest 202 for facilitating the use of the pen sensitive screen 218. As best shown in FIG. 3, when the pen computer 102 is in the open position (i.e., the angle 118 is equal to 180 degrees), the palm rest 202 is level with the pen sensitive screen 218 (that is, the palm rest 202 and the pen sensitive screen 218 are in the same plane 302). Also, the palm rest 202 is a flat surface and contains no protrusions (any protrusions that may be present on the palm rest 202, such as the speaker 204 and/or the slot 208, are minimal in dimension and are positioned, i.e., centered, so as to not obstruct the movement of a hand resting on the palm rest 202).

Figure 4:
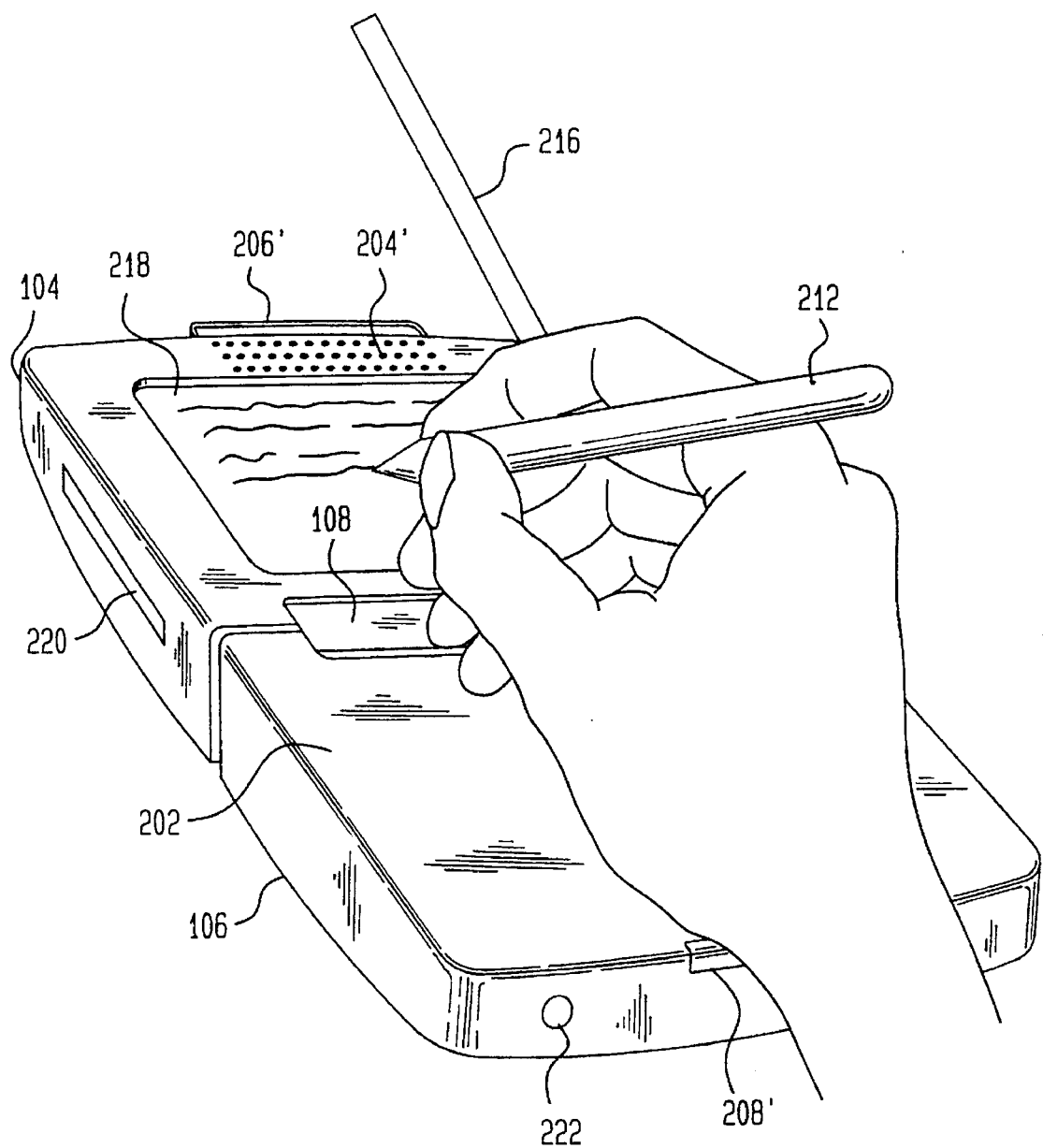

Accordingly, the palm rest 202 represents an ideal surface for the user to rest the palm of her hand while writing on the pen sensitive screen 218. This is depicted in FIG. 4 (in the embodiment of FIG. 4, the speaker 204' is located in the first member 104, and an alternate first latching mechanism is employed). By enabling the user to rest her palm while writing, the present invention reduces fatigue, enhances legibility, enables use of the entire screen 218, reduces false readings, and increases the overall useability of the pen sensitive screen 218, and of the pen computer 102 itself. These advantages are achieved in both stationary and mobile situations, and sitting and standing situations, since the palm rest 202 is integrated with the pen sensitive screen 218. Also, these advantages are achieved whether or not there is a level surface on which to rest the pen computer 102.

As shown in FIGS. 1 and 2, the first and second members 104, 106 each preferably has a length L of approximately 5 inches, a height H of approximately 0.75 inches, and a width W of approximately 8 inches. Accordingly, when in the closed position, the pen computer 102 preferably has a length L of approximately 5 inches, a height 2*H of approximately 1.5 inches, and a width W of approximately 8 inches. When in the open position, the pen computer 102 preferably has a length 2*L of approximately 10 inches, a height H of approximately 0.75 inches, and a width W of approximately 8 inches. Accordingly, when in the closed position, the pen computer 102 is very small and, thus, very mobile. When in the open position, the pen computer 102 provides a palm rest 202 for facilitating the use of the pen sensitive display 218, as discussed above.

As stated above, the first member 104 and the second member 106 are rotatably connected to the connector 108. Preferably, the connector 108 is implemented as a double hinge joint such that the first member 104 is rotatable about the first axis 114, and the second member 106 is independently rotatable about the second axis 116.

Figure 5:
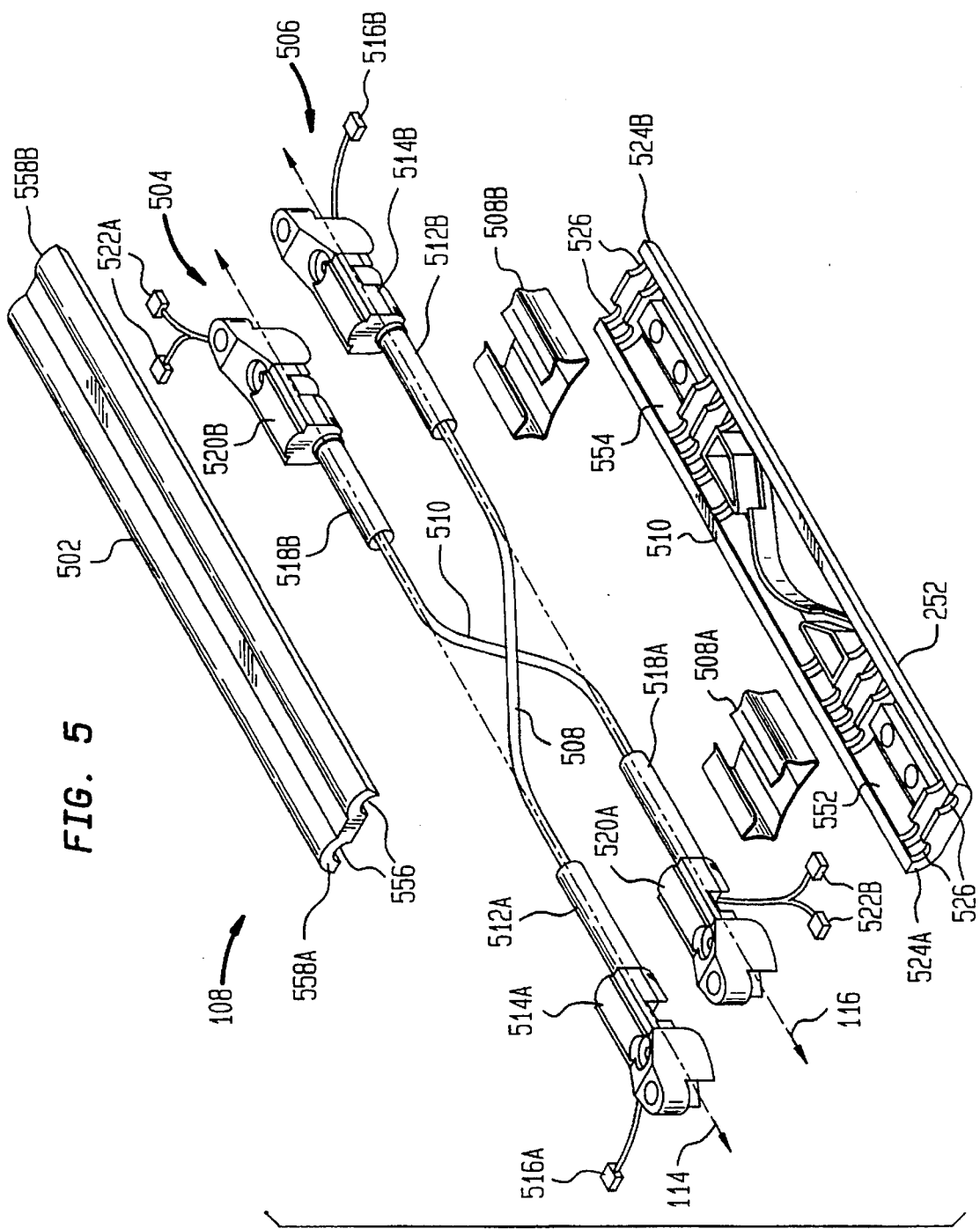
FIG. 5 is an exploded view of a double hinge connector used with the present invention.

FIG. 5 is an exploded view of a double hinge connector 108 according to a preferred embodiment of the present invention. The connector 108 includes a first electrical cable 508 and a second electrical cable 510. The first and second cable 508 each comprises one or more electrical wires. Terminals 516A and 516B are connected to the ends of the first cable 508, and terminals 522A and 522B are connected to the ends of the second cable 510. These terminals 516 and 518 are connected in a well known manner to electrical components in the pen computer 102. The first and second cables 508, 510 are configured in a "criss-cross" pattern such that terminals 516A and 522A are located in the first member 104 and terminals 516B and 522B are located in the second member 106. In this manner, signals may be exchanged between the first and second members 104, 106.

End pieces 514A, 514B are fixedly attached proximate to each end of the first cable 508. Sleeves 512A and 512B are connected to the end pieces 514A and 514B, respectively. Similarly, end pieces 520A, 520B are fixedly attached proximate to each end of the second cable 510, and sleeves 518A and 518B are connected to the end pieces 520A and 520B, respectively.

As discussed below, end piece 514A, sleeve 512A, sleeve 518B, and end piece 520B represent the first axis 114 about which the first member 104 rotates (in essence, such components represent a first hinge). End piece 520A, sleeve 518A, sleeve 512B, and end piece 514B represent the second axis 116 about which the second member 106 rotates (in essence, such components represent a second hinge).

Sleeves 512A and 518A are secured in clamp 508A, and clamp 508A snaps into a compartment 552 of a first plate 510. In snapping the clamp 508A into the compartment 552, the sleeves 512A and 518A rest in groves 526 formed in a first side 524A of the first plate 510. Also, sleeves 518b and 512B are secured in clamp 508B, and clamp 508B snaps into a compartment 554 of the first plate 510. In snapping the clamp 508B into the compartment 554, the sleeves 518B and 512B rest in groves 526 formed in a second side 524B of the first plate 510.

The first plate 510 has a flat surface 252. As shown in FIG. 2, this flat surface 252 of the first plate 510 forms part of the palm rest 202.

A second plate 502 is secured to the first plate 510 using any well known securing means, such as bolts, screws, etc. The sleeves 512A and 518A rest in groves 556 formed in a first side 558A of the second plate 502, and the sleeves 518B and 512B rest in groves 556 (not shown) formed in a second side 558B of the second plate 502.

Figure 6:
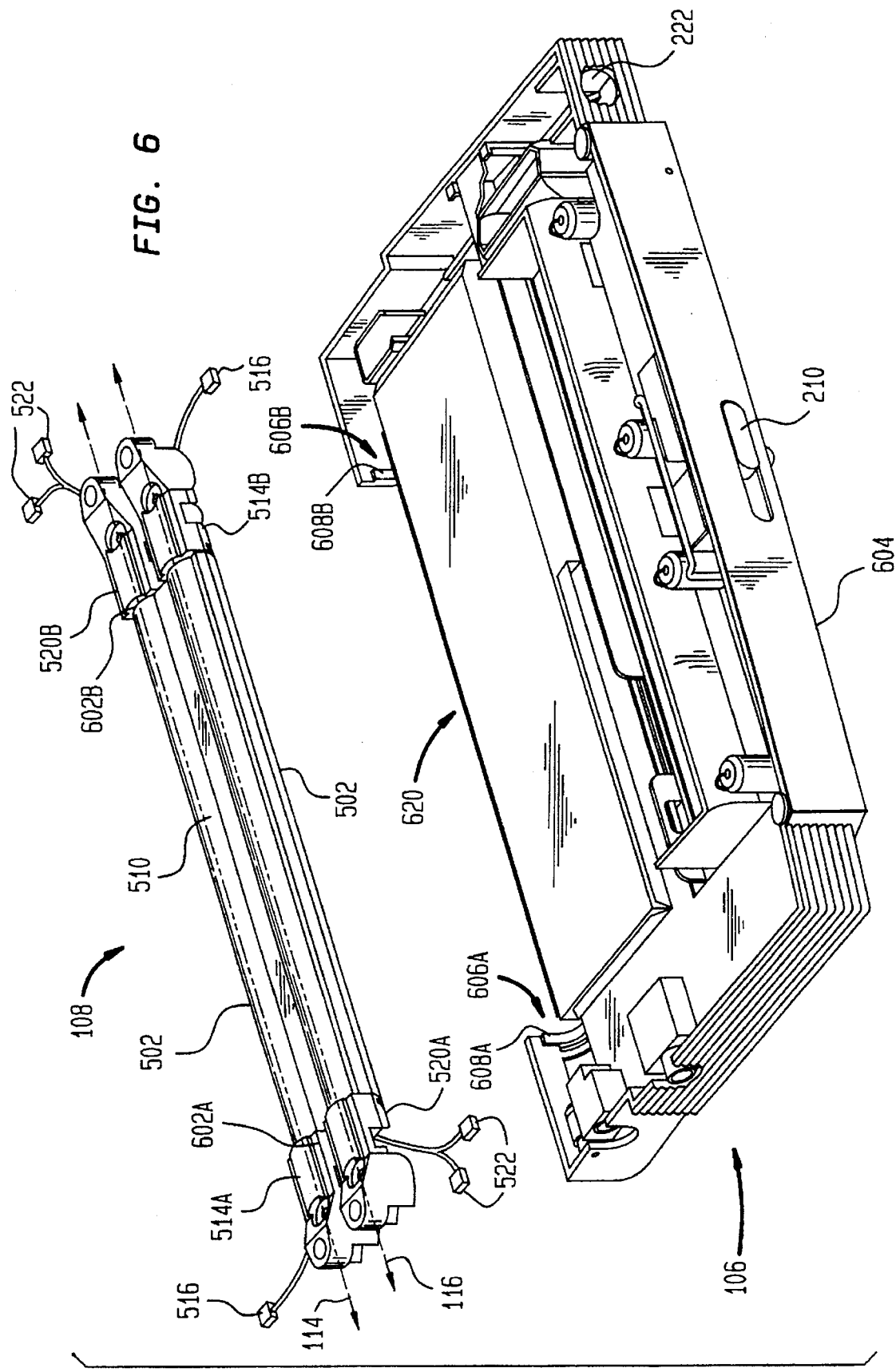
FIGS. 6 and 7 are perspective views showing the double hinge connector being inserted into a second member of the pen computer of the present invention.

A fully assembled double hinge connector 108 is shown in FIG. 6. A slot 602A is formed between the end pieces 514A, 520A and the first and second plates 510, 502. Similarly, a slot 602B is formed between the end pieces 520B, 514B and the first and second plates 510, 502.

One half of the connector 108 (i.e., the second hinge) corresponding to the second axis 116 is inserted into a compartment 620 of a housing 604 of the second member 106. A portion of slot 602A adjacent to end piece 520A is inserted into an opening 606A of the compartment 620. This opening 606A is formed by U-shaped side 608A. The sleeve 518A is in frictional contact with this U-shaped side 608A. Similarly, a portion of slot 602B adjacent to end piece 514B is inserted into an opening 606B of the compartment 620. This opening 606B is formed by U-shaped side 608B. The sleeve 512B is in frictional contact with this U-shaped side 608B.

Figure 7:
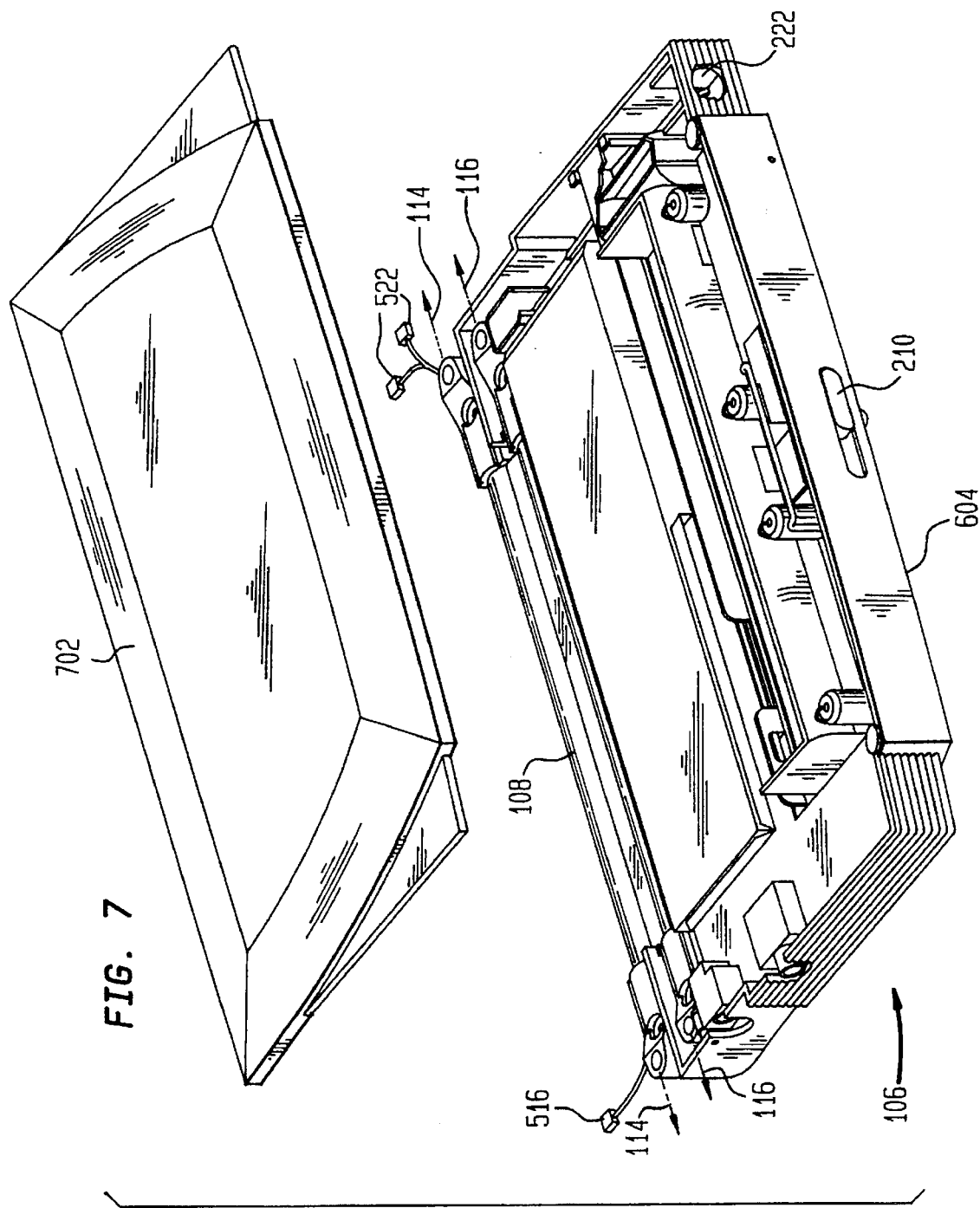

FIG. 7 depicts the connector 108 partially inserted within the compartment 620 of the housing 604 of the second member 106. A housing plate 702 is attached to the housing 604 to thereby secure the portion of the connector 108 corresponding to the second axis 116 within the second member 106. Since the connector 108 is not fixedly secured within the second member 106, the second member 106 is rotatable about the second axis 116.

The portion of the connector 108 (i.e., the first hinge) corresponding to the first axis 114 is inserted and secured within the first member 104 in a similar manner.

Figure 9:
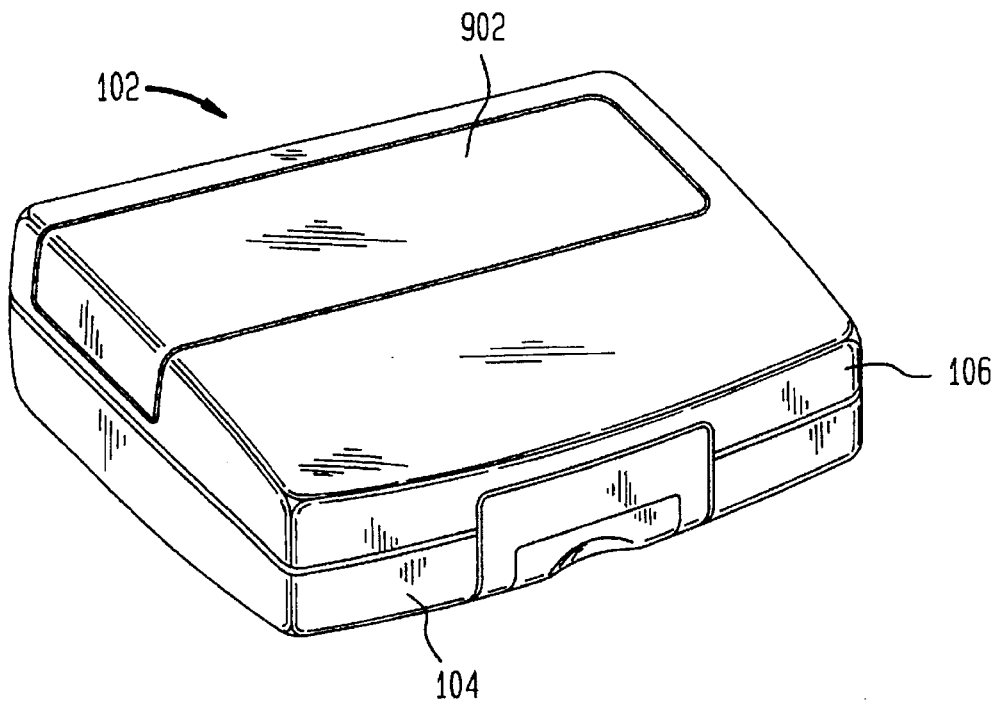
FIGS. 9 and 10 depict an alternate embodiment of the present invention.
Figure 10:
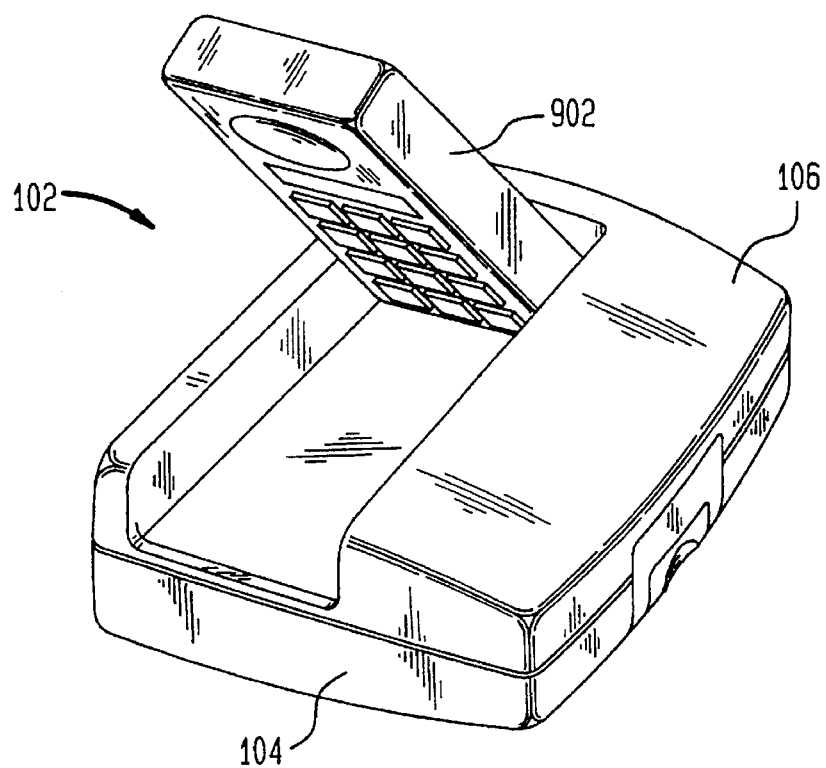

FIG. 9 illustrates an alternate embodiment of the present invention, wherein a well known cellular telephone handset 902 is inserted within a cavity formed in the second member 106. A latching mechanism (not shown) secures the handset 902 in this cavity FIG. 10 shows the handset 902 released from the cavity in the second member 106.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A pen computer, comprising:
   a double hinged connector having a first flat surface;
   a first member having a surface defining a plane, said first member rotatably connected to said connector, said first member having a pen sensitive screen; and
   a second member, also rotatably connected to said connector, said second member having a second flat surface substantially covering said entire second member, said second flat surface free from pen sensitive screen areas;

said pen computer being in a closed position when an angle between said first and second members is substantially equal to zero degrees, said pen computer being in an open position when said angle between said first and second members is substantially equal to 180 degrees, said pen computer capable of receiving handwritten data entry in said open position;

said first and second flat surfaces being entirely in said plane defined by said first member when said pen computer is in said open position, wherein said second flat surface and said connector are a palm rest in said open position for facilitating use of said pen sensitive screen.

2. The pen computer of claim 1, wherein said connector comprises first and second hinges, said first member being rotatably connected to said first hinge, and said second member being rotatably connected to said second hinge.

3. The pen computer of claim 1, further comprising a latching mechanism to lock said pen computer in said open position.

4. The pen computer of claim 1, wherein said first and second members each have a length of approximately 5 inches, a height of approximately 0.75 inches, and a width of approximately 8 inches.

5. The pen computer of claim 1, wherein said pen sensitive screen has a landscape orientation.

6. The pen computer of claim 1, wherein said second member has a cavity for housing a device.

* * * * *